(12) United States Patent
Matthai et al.

(10) Patent No.: US 10,202,992 B2
(45) Date of Patent: Feb. 12, 2019

(54) WORKSTATION ACCESSORY INCLUDING A CLAMP MECHANISM

(71) Applicant: Herman Miller, Inc., Zeeland, MI (US)

(72) Inventors: John Matthai, Holland, MI (US);
Jeremy Laarman, Zeeland, MI (US);
Michael Katje, Grand Haven, MI (US)

(73) Assignee: Herman Miller, Inc., Zeeland, MI (US)

( * ) Notice: Subject to any disclaimer, the term of this patent is extended or adjusted under 35 U.S.C. 154(b) by 0 days.

(21) Appl. No.: 15/618,194

(22) Filed: Jun. 9, 2017

(65) Prior Publication Data

US 2017/0354247 A1    Dec. 14, 2017

Related U.S. Application Data

(60) Provisional application No. 62/348,448, filed on Jun. 10, 2016.

(51) Int. Cl.

| A47B 41/04 | (2006.01) |
|---|---|
| F16B 2/12 | (2006.01) |
| F16M 13/02 | (2006.01) |
| A47B 21/03 | (2006.01) |

(52) U.S. Cl.
CPC ............ *F16B 2/12* (2013.01); *A47B 21/0314* (2013.01); *F16M 13/022* (2013.01)

(58) Field of Classification Search
CPC .................................................. A47B 17/033
USPC ...................................................... 108/97, 98
See application file for complete search history.

(56) References Cited

U.S. PATENT DOCUMENTS

| 602,708 A | 4/1898 | Siegfried |
|---|---|---|
| 980,762 A | 1/1911 | Cooper |
| 2,942,924 A | 6/1960 | Stangert |
| 2,944,861 A | 7/1960 | Lessin |
| 2,981,583 A | 4/1961 | Eisenberg |
| 3,027,214 A | 3/1962 | Curatolo |
| 3,117,534 A | 1/1964 | Martland |
| 3,326,147 A | 6/1967 | Toney |
| 3,688,419 A | 9/1972 | Woolman |
| 3,786,765 A | 1/1974 | Burr |
| 4,044,694 A | 8/1977 | Wylie |
| 4,612,863 A | 9/1986 | Vonhausen et al. |
| 4,637,666 A | 1/1987 | Worrell et al. |
| 4,852,500 A | 8/1989 | Ryburg et al. |
| 4,974,913 A | 12/1990 | Vogt et al. |

(Continued)

FOREIGN PATENT DOCUMENTS

| EP | 0985367 A2 | 3/2000 |
|---|---|---|
| WO | 2009052656 A1 | 4/2009 |

*Primary Examiner* — Matthew W Ing
(74) *Attorney, Agent, or Firm* — Michael Best & Friedrich LLP (57) ABSTRACT

A workstation includes a working surface, a channel within the working surface, a rail positioned within the channel, and a clamp mechanism having an accessory and an actuator operable to removably couple the clamp mechanism to the rail. The actuator includes a first side that has a first manually engageable surface and a second side that has a second manually engageable surface. The actuator is movable to a first position in which the clamp mechanism disengages the rail when a force is exerted on the first manually engageable surface, and is movable to a second position in which the clamp mechanism engages the rail when a force is exerted on the second manually engageable surface.

20 Claims, 7 Drawing Sheets

(56) References Cited

U.S. PATENT DOCUMENTS

| | | | |
|---|---|---|---|
| 5,103,741 A | 4/1992 | Grund et al. | |
| 5,975,657 A | 11/1999 | LaCour | |
| 6,189,268 B1 | 2/2001 | Carr et al. | |
| 6,725,784 B2 * | 4/2004 | Crinion | A47B 17/00 108/50.01 |
| 6,751,914 B2 | 6/2004 | Zeh et al. | |
| 7,707,790 B2 | 5/2010 | Williams et al. | |
| 8,109,215 B2 | 2/2012 | Kitada et al. | |
| 8,181,405 B2 | 5/2012 | Nash | |
| 8,667,908 B2 | 3/2014 | Martin et al. | |
| 8,701,568 B2 | 4/2014 | Miller et al. | |
| 9,185,974 B2 | 11/2015 | Martin et al. | |
| 9,210,999 B2 | 12/2015 | Martin et al. | |
| 9,220,342 B2 | 12/2015 | Byrne et al. | |
| 9,247,812 B2 | 2/2016 | Parshad | |
| 2003/0051415 A1 | 3/2003 | Remelts et al. | |
| 2007/0131149 A1 * | 6/2007 | Mayben | A47B 57/00 108/97 |
| 2014/0182229 A1 | 7/2014 | Dame et al. | |
| 2014/0318423 A1 | 10/2014 | Parshad | |
| 2015/0123531 A1 | 5/2015 | Henriott et al. | |
| 2016/0058185 A1 | 3/2016 | Martin et al. | |

* cited by examiner

WORKSTATION ACCESSORY INCLUDING A CLAMP MECHANISM

CROSS-REFERENCE TO RELATED APPLICATIONS

This application claims priority to U.S. Provisional Patent Application No. 62/348,448, filed Jun. 10, 2016, the entire contents of which are incorporated by reference herein.

BACKGROUND

The present invention relates to a workstation or table that is divided into one or more workspaces and includes one or more accessories.

SUMMARY

In one embodiment, the invention provides a workstation including a working surface, a channel within the working surface, a rail positioned within the channel, and a clamp mechanism including an accessory and an actuator operable to removably couple the clamp mechanism to the rail. The actuator includes a first side that has a first manually engageable surface and a second side that has a second manually engageable surface. The actuator is movable to a first position in which the clamp mechanism disengages the rail when a force is exerted on the first manually engageable surface, and is movable to a second position in which the clamp mechanism engages the rail when a force is exerted on the second manually engageable surface.

In another embodiment, the invention provides a clamp mechanism configured to be removably coupled to a rail of a workstation. The clamp mechanism includes a body, an accessory coupled to the body, and an actuator coupled to the body and configured to removably couple the clamp mechanism to the rail. The actuator includes a first side that has a first manually engageable surface and a second side that has a second manually engageable surface. The actuator is movable to a first position in which the clamp mechanism disengages the rail when a force is exerted on the first manually engageable surface, and is movable to a second position in which the clamp mechanism engages the rail when a force is exerted on the second manually engageable surface.

In yet another embodiment, the invention provides a method of removably coupling a clamp mechanism to a rail positioned within a channel of a workstation. The clamp mechanism includes an accessory and an actuator. The actuator has a first side with a first manually engageable surface and a second side with a second manually engageable surface. The method includes positioning the clamp mechanism on the rail, applying a force on the second manually engageable surface of the actuator, and moving, in response to the force on the second manually engageable surface, the actuator to a position in which the clamp mechanism engages the rail. The method also includes applying a force on the first manually engageable surface of the actuator and moving, in response to the force on the first manually engageable surface, the actuator to a position in which the clamp mechanism disengages the rail.

Other aspects of the invention will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

Figure 1:
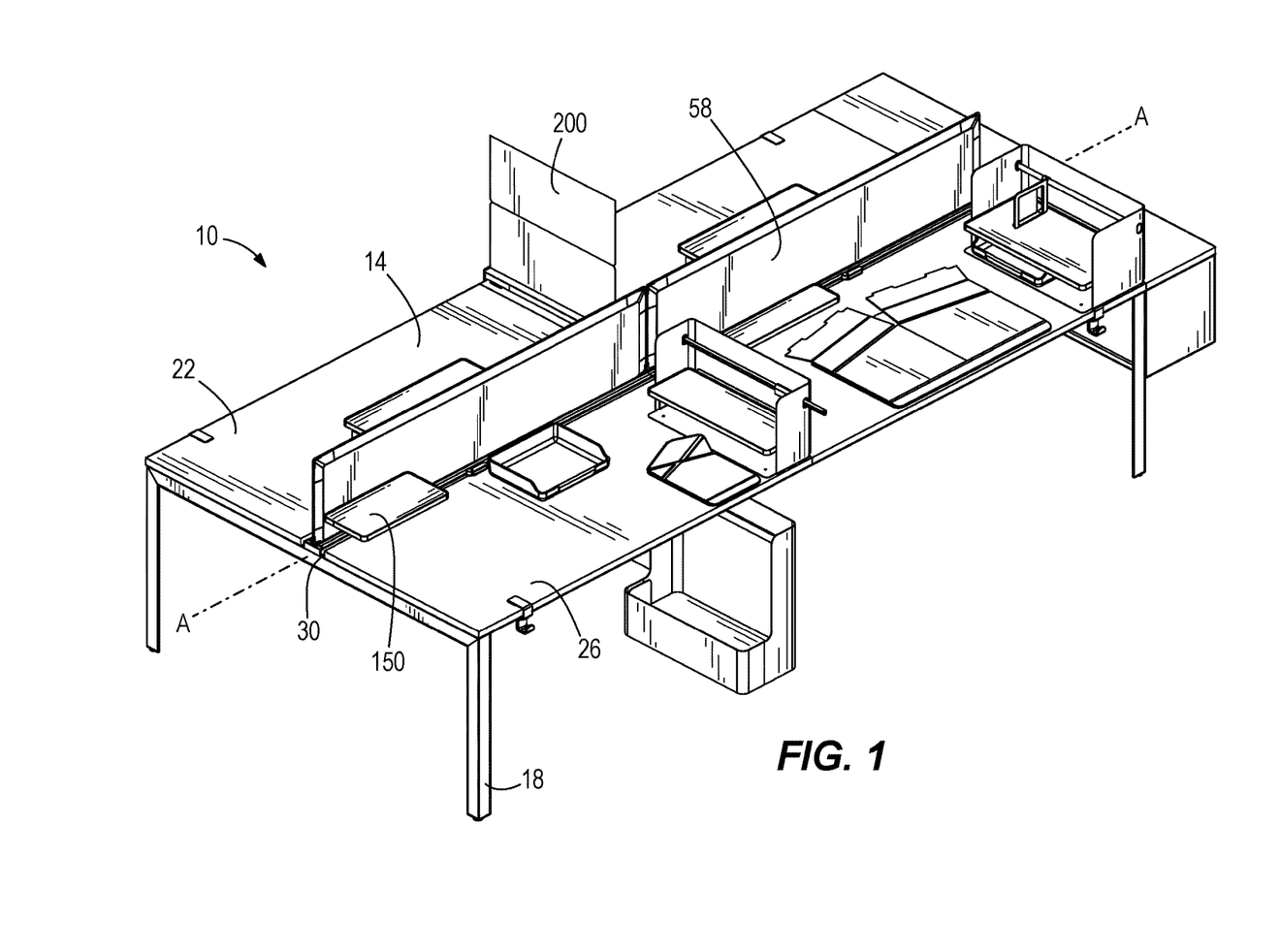
FIG. 1 is a perspective view of a workstation including a rail and a clamp mechanism.
Figure 2:
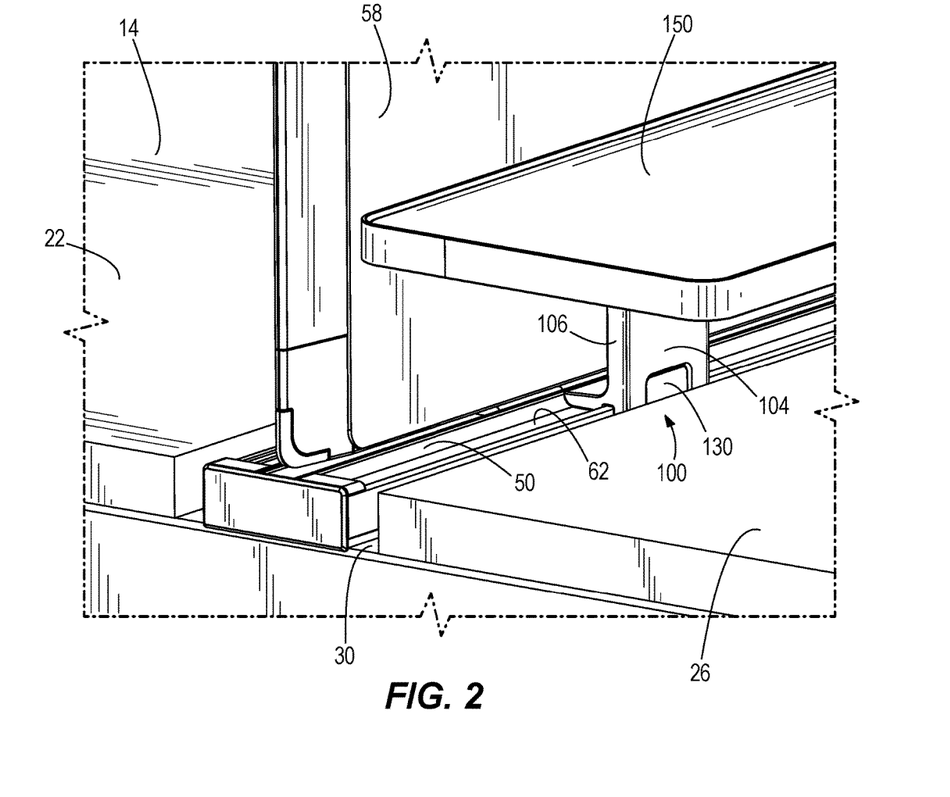
FIG. 2 is a detailed perspective view of the clamp mechanism coupled to the rail.
Figure 3:
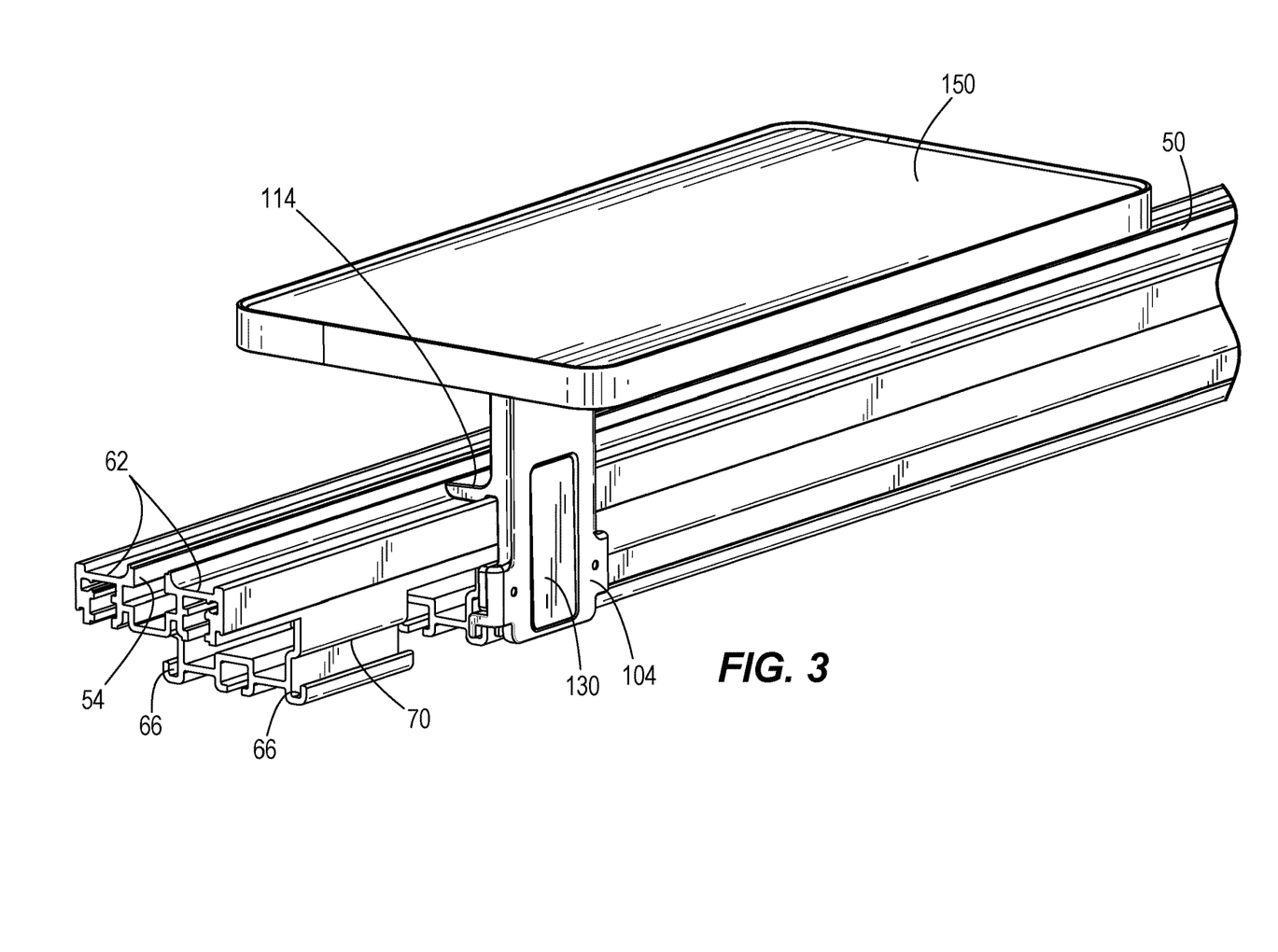
FIG. 3 is a perspective view of the clamp mechanism coupled to the rail.

FIG. 1 illustrates a workstation 10. The illustrated workstation 10 is configured as a table that is divided into four workspaces for different users and that defines a longitudinal axis A. In other embodiments, the workstation 10 may include fewer or more workspaces for one or more users. The workstation 10 includes a working surface 14 coupled to a support structure 18, which includes a plurality of legs in the illustrated embodiment. In the illustrated embodiment, a first portion 22 of the working surface 14 is included in a first side of the workstation 10 and a second portion 26 of the working surface 14 is included in a second side of the workstation 10. The workstation 10 includes a channel 30 that extends along the longitudinal axis A and separates the first and second portions 22, 26. In other embodiments, the working surface 14 may have other constructions. For example, among other constructions, the working surface 14 could be constructed as a single piece of material with a channel integrally formed between (i.e., separating) the first and the second portions.

With respect to FIGS. 1-6, the workstation 10 includes a support rail 50 positioned in the channel 30. The rail 50 is spaced apart from each of the first and the second portions 22, 26 of the working surface 14 by a gap 28 having a distance $d_1$ (see FIGS. 5 and 6). The rail 50 includes a center channel 54 for supporting a partition 58 that extends along the longitudinal axis A (FIGS. 3-6). The rail 50 also includes upper grooves 62 and lower grooves 66 positioned on both sides of the center channel 54. The upper grooves 62 are formed in an upper surface 64 of the rail 50. The lower grooves 66 are formed in side surfaces 68 of the rail 50. The grooves 62, 66 extend parallel to the center channel 54 (see FIGS. 2-6). The illustrated rail 50 also includes engagement surfaces 70 (FIGS. 3 and 4) adjacent the lower grooves 66. The engagement surfaces 70 extend parallel to the center channel 54 on both sides of the rail 50. The upper and lower grooves 62, 66 and the engagement surfaces 70 are configured to be engaged by a clamp mechanism 100.

Figure 4:
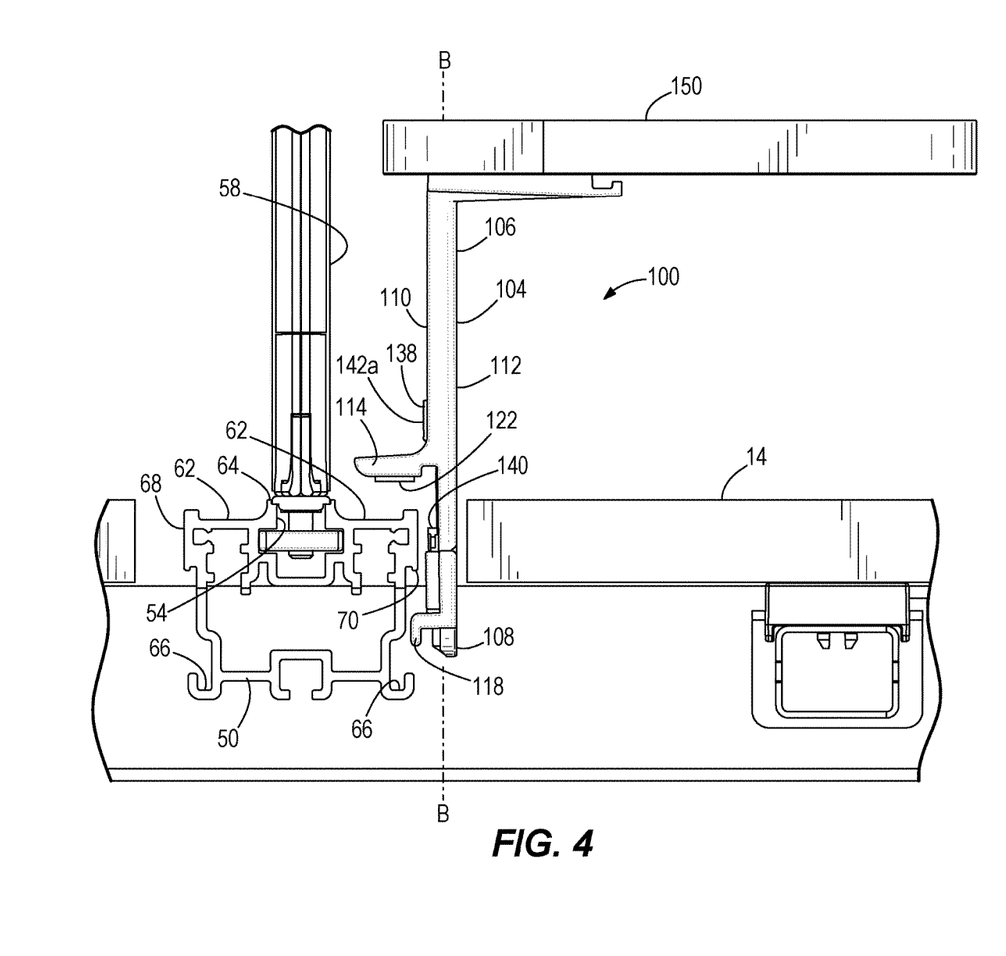
FIG. 4 is a side view of the clamp mechanism displaced from the rail.
Figure 5:
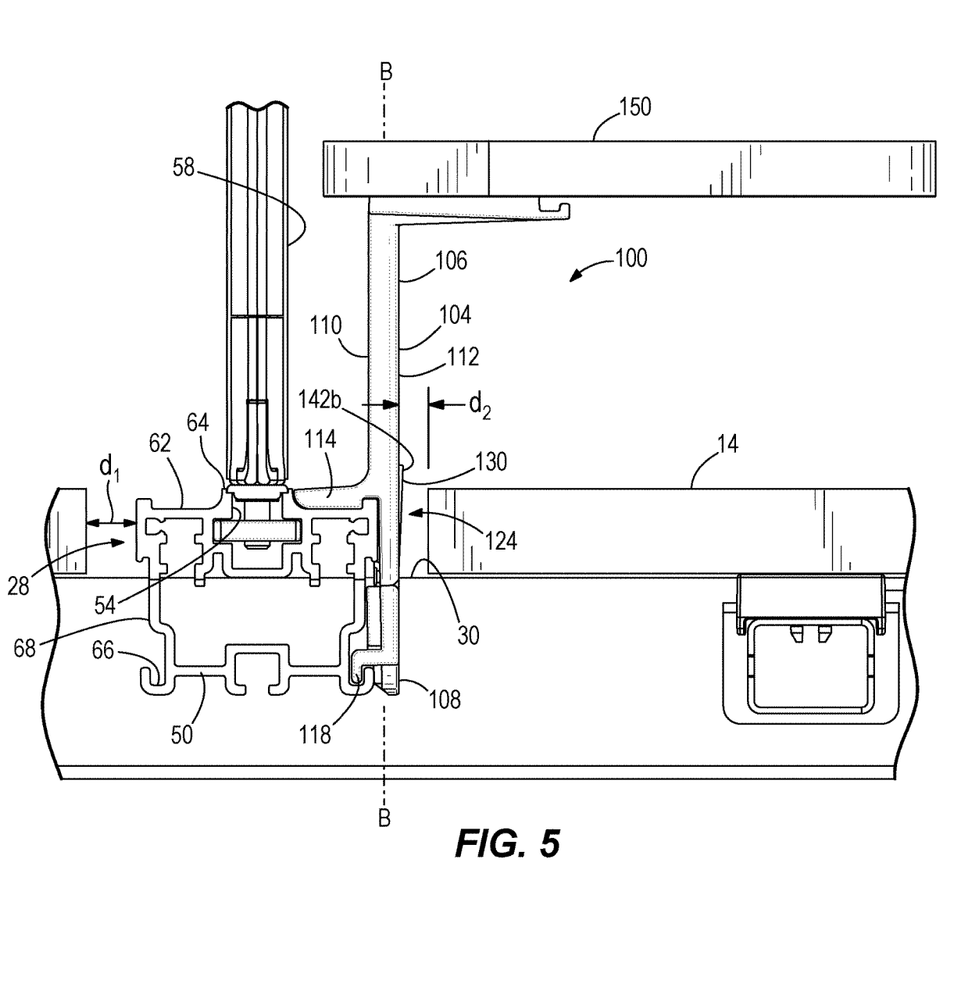
FIG. 5 is a side view of the clamp mechanism positioned on the rail.
Figure 6:
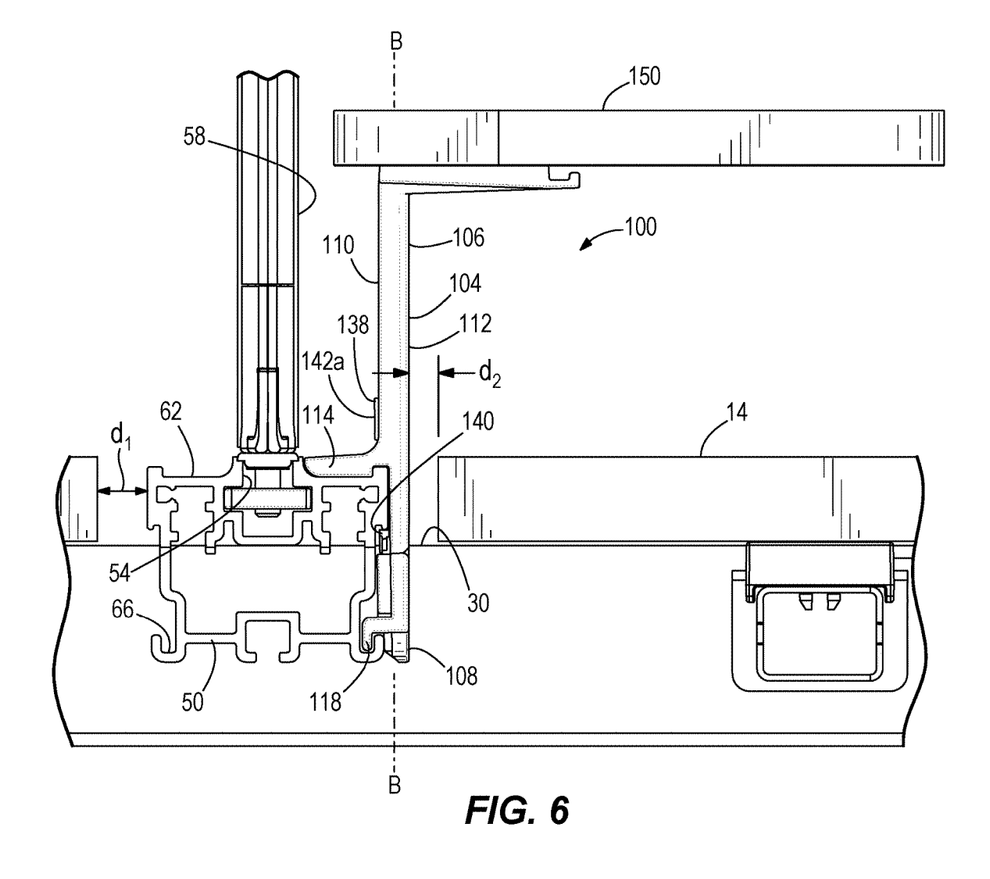
FIG. 6 is side view of the clamp mechanism secured to the rail.

FIGS. 3-9 illustrate the clamp mechanism 100 in greater detail. The clamp mechanism 100 includes a body 104 having an upper end 106, a lower end 108, a first side 110, and a second side 112. The body 104 defines a longitudinal axis B that extends through the upper end 106 and the lower end 108. The illustrated body 104 also has a first portion 114 located between the upper end 106 and the lower end 108, an aperture 116 that extends parallel to the axis B along a length of the body 104 (FIG. 8), one or more second portions or hooks 118, and a recess 120 that is adjacent the first portion 114. The first portion 114 extends in a direction substantially perpendicular to the axis B and is selectively received in one of the upper grooves 62 of the rail 50. The second portion 118 is located at the lower end 108 and is selectively received in one of the side grooves 66 of the rail 50. The recess 120 is formed in the body 104 above the first portion 114, while the aperture 116 is formed in the body 104 between the first portion 114 and the second portion 118. In the illustrated embodiment, the first portion 114 includes one or more downwardly-facing pads 122 (FIG. 4). In the illustrated embodiment, the pads 122 are foam or rubber that can compress when the first portion 114 is received in the upper groove 62. In other embodiments, the pads 122 may be any suitable material. When the clamp mechanism 100 is coupled to the rail 50, the body 104 is spaced apart from each of the first and the second portions 22, 26 of the work surface by a gap 124 having a distance $d_2$ (see FIG. 4-6).

Figures 7, 8, 9:
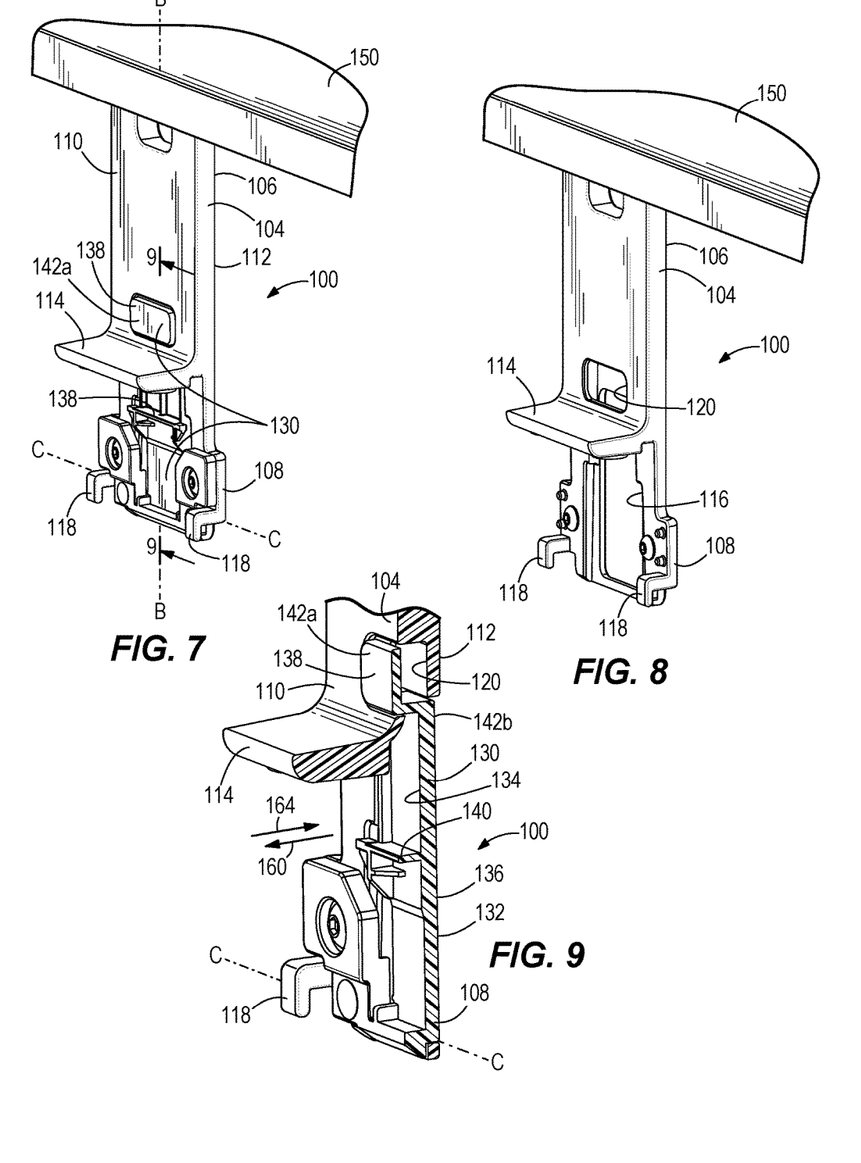
FIG. 7 is a perspective view of the clamp mechanism.
FIG. 8 is a perspective view of the clamp mechanism with an actuator removed.
FIG. 9 is a cross-sectional view of a portion of the clamp mechanism taken along section line 9-9 of FIG. 7.

The clamp mechanism 100 also includes an actuator 130. The illustrated actuator 130 is movably (e.g., pivotably) coupled to the body 104 about a pivot axis C that is perpendicular to the axis B (FIG. 9). In the illustrated embodiment, the pivot axis C extends through the lower end of the body 104. The actuator 130 includes a body 132 that has a first side 134 and a second side 136. The actuator 130 has a first projection 138 that extends from the first side 134 and that is moveable within the recess 120. In the illustrated embodiment, the first projection 138 is substantially L-shaped, but may have other configurations in additional or alternative embodiments. The actuator 130 also includes a second projection 140 that extends from the first side 134 and through the aperture 116. The second projection 140 selectively engages the engagement surface 70 of the rail 50. The actuator 130 includes a first manually engageable surface 142a and a second manually engageable surface 142b on opposite sides of the actuator 130. In the illustrated embodiment, the first manually engageable surface 142a is a surface of the first projection 138 on the first side 134 of the body 132, and the second manually engageable surface 142b is on the second side 136 of the body 132. When coupled to the rail 50, the first manually engageable surface 142a is adjacent the rail 50 and is not visible to the user when viewed from the working surface 14. In addition, and the second manually engageable surface 142b is adjacent the working surface 14 and visible to the user when viewed from the working surface 14.

In the illustrated embodiment, the clamp mechanism 100 further includes an accessory 150. The accessory 150 is supported by the body 104 of the clamp mechanism 100. More particularly, the accessory 150 is supported at the upper end of the body 104. The accessory 150 provides a user with some additional functionality in the workstation 10, such as storage, information displays, lighting, decorations, and the like. In the illustrated embodiment, the accessory 150 is a shelf extending outwardly from the body 104. In other or additional embodiments, the clamp mechanism 100 may include any other suitable workspace accessory, such as a lamp, a pen holder, a phone or tablet mount, etc.

The clamp mechanism 100 is configured to be removably coupled to the rail 50. With respect to FIGS. 4-8, to couple the clamp mechanism 100 to the rail 50, the second portion 118 is positioned in the lower groove 66 and the first portion 114 is positioned in the upper groove 62. Movement of the actuator 130 in the direction of arrow 160 by a force on the second manually engageable surface 142b moves the actuator 130 to an engaged position such that the first projection 138 engages with the first portion 114 and the second projection 140 engages with the surface 70. In the engaged position, the projection 138 extends beyond the first side 110 of the body 104 and the second side 136 of the actuator 130 is substantially flush with the second side 112 of the body 104, as shown in FIG. 4. Accordingly, the actuator 130 is manually actuated to secure the clamp mechanism 100 to the rail 50.

With respect to FIGS. 1-3 and 6, when the clamp mechanism 100 is coupled to the rail 50, the clamp mechanism 100 is positioned between the rail 50 and the working surface 14, the first portion 114 is received within one of the upper grooves 62, and the second portions 118 are received in one of the lower grooves 66. The pads 122 help create a tight fit so that the accessory 150 feels rigid and eliminates rattle. The pads 122 also inhibit damage to the upper groove 62.

With respect to FIGS. 6-9, to remove or displace the clamp mechanism 100 from the rail 50, a force in the direction of arrow 164 (FIG. 8) is exerted on the first manually engageable surface 142a of the actuator 130, which pivots the actuator 130 about the pivot axis C such that the actuator 130 is in a disengaged position. In the disengaged position, the first projection 138 is disengaged from the first portion 114 and is positioned within the recess 120 and the second projection 140 is disengaged from the surface 70. Also, the second side of the actuator 130 projects beyond the second side 112 of the body 104 in the disengaged position. When the actuator 130 is in the disengaged position, the first portion 114 is removable from the upper groove 62 and the second portions 118 are removable from the lower groove 66. Accordingly, the clamp mechanism 100 can be removed from the rail 50.

In the illustrated embodiment, the workstation 10 may also include a second partition 200 coupled to the working surface 14 transverse to the longitudinal axis A to further divide the working surface into four workspaces. In other or additional embodiments, the second partition 200 can be omitted such that each of the first and the second portions 22, 26 of the working surface 14 creates a workspace or additional second partitions 200 can be included to further divide the working surface 14 into additional workspaces.

Various features and advantages of the invention are set forth in the following claims.

What is claimed is:

1. A workstation comprising:
   a working surface;
   a channel within the working surface;
   a rail positioned within the channel; and
   a clamp mechanism including a body, an accessory supported by the body, and an actuator movably coupled to the body and operable to removably couple the clamp mechanism to the rail, the actuator including a first side that has a first manually engageable surface accessible from a first side of the body and a second side that has a second manually engageable surface accessible from a second side of the body, the actuator being movable to a first position in which the clamp mechanism disengages the rail when a force is exerted on the first manually engageable surface, and being movable to a second position in which the clamp mechanism engages the rail when a force is exerted on the second manually engageable surface.

2. The workstation of claim 1, wherein the body has a longitudinal axis, and wherein the actuator is pivotable between the first position and the second position about a pivot axis that is perpendicular to the longitudinal axis.

3. The workstation of claim 2, wherein accessory is supported at an upper end of the body, and wherein the pivot axis extends through a lower end of the body.

4. The workstation of claim 1, wherein the rail includes a first groove formed in an upper surface of the rail and a second groove formed in a side surface of the rail, wherein the second groove extends parallel to the first groove, and wherein the body includes
  a first portion selectively received by the first groove in the rail,
  a second portion selectively received by the second groove in the rail,
  a recess formed above the first portion, and
  an aperture extending along a length of the body between the first portion and the second portion.

5. The workstation of claim 4, wherein the first portion includes a downwardly-facing pad.

6. The workstation of claim 4, wherein the actuator of the clamp mechanism includes
  a first projection having the first manually engageable surface that is movable within the recess, and
  a second projection that extends through the aperture, the second projection engaging a surface of the rail adjacent the second groove when the actuator is moved to the second position.

7. The workstation of claim 6, wherein
  when the actuator is in the first position, the first projection is received within the recess of the body and the second projection disengages the surface of the rail, and
  when the actuator is in the second position, the first projection extends outwardly from the recess of the body and the second projection extends outwardly from the aperture of the body and engages the surface of the rail.

8. The workstation of claim 1, wherein the clamp mechanism includes an upper end supporting the accessory, wherein
  when the actuator is in the first position, the first manually engageable surface is positioned within a recess of the body and the second manually engageable surface extends beyond the second side of the body, and
  when the actuator is in the second position, the first manually engageable surface extends beyond the first side of the body and the second manually engageable surface is substantially flush with the second side of the body.

9. The workstation of claim 8, wherein the first side of the body faces toward the rail, and wherein the second side of the body faces away from the rail and toward the working surface.

10. The workstation of claim 1, wherein the rail and the working surface define a gap therebetween, and wherein the gap is sized to receive the clamp mechanism such that the clamp mechanism is spaced apart from the working surface when the clamp mechanism is coupled to the rail.

11. The workstation of claim 1, further comprising a partition supported by the rail, and wherein the first manually engageable surface faces the partition.

12. A clamp mechanism configured to be removably coupled to a rail of a workstation, the clamp mechanism comprising:
  a body;
  an accessory coupled to the body; and
  an actuator coupled to the body and configured to removably couple the clamp mechanism to the rail, the actuator including a first side that has a first manually engageable surface accessible from a first side of the body and a second side that has a second manually engageable surface accessible from a second side of the body, the actuator being movable to a first position in which the clamp mechanism disengages the rail when a force is exerted on the first manually engageable surface, and being movable to a second position in which the clamp mechanism engages the rail when a force is exerted on the second manually engageable surface.

13. The clamp mechanism of claim 12, wherein the body includes a longitudinal axis, wherein the actuator is pivotable between the first position and the second position about a pivot axis that is perpendicular to the first longitudinal axis.

14. The clamp mechanism of claim 13, wherein the accessory is supported at an upper end of the body, and wherein the pivot axis extends through a lower end of the body.

15. The clamp mechanism of claim 12, wherein the body includes
  a first portion configured to be received by a first groove formed in an upper surface of the rail,
  a second portion configured to be received by a second groove formed in a side surface of the rail,
  a recess formed above the first portion, and
  an aperture extending along a length of the body between the first portion and the second portion.

16. The clamp mechanism of claim 15, wherein the first portion includes a downwardly-facing pad.

17. The clamp mechanism of claim 15, wherein the actuator includes
  a first projection having the first manually engageable surface that is movable within the recess, and
  a second projection that extends through the aperture, the second projection being configured to engage a surface of the rail adjacent the second groove when the actuator is moved to the second position.

18. The clamp mechanism of claim 17, wherein
  when the actuator is in the first position, the first projection is received within the recess of the body and the second projection is configured to disengage the surface of the rail, and
  when the actuator is in the second position, the first projection extends outwardly from the recess of the body and the second projection extends outwardly from the aperture of the body and is configured to engage the surface of the rail.

19. The clamp mechanism of claim 12, wherein the body includes an upper end supporting the accessory, wherein
  when the actuator is in the first position, the first manually engageable surface is positioned within a recess of the body and the second manually engageable surface extends beyond the second side of the body, and
  when the actuator is in the second position, the first manually engageable surface extends beyond the first side of the body and the second manually engageable surface is substantially flush with the second side of the body.

20. A method of removably coupling a clamp mechanism to a rail positioned within a channel of a workstation, the clamp mechanism including a body, an accessory supported by the body, and an actuator movably coupled to the body, the actuator having a first side with a first manually engageable surface accessible from a first side of the body and a second side with a second manually engageable surface accessible from a second side of the body, the method comprising:
- positioning the clamp mechanism on the rail;
- applying a force on the second manually engageable surface of the actuator;
- moving, in response to the force on the second manually engageable surface, the actuator to a position in which the clamp mechanism engages the rail;
- applying a force on the first manually engageable surface of the actuator; and
- moving, in response to the force on the first manually engageable surface, the actuator to a position in which the clamp mechanism disengages the rail.

* * * * *